Jan. 1, 1935.   H. E. WARREN   1,986,613
POSITION SIGNALING SYSTEM
Filed Oct. 25, 1929
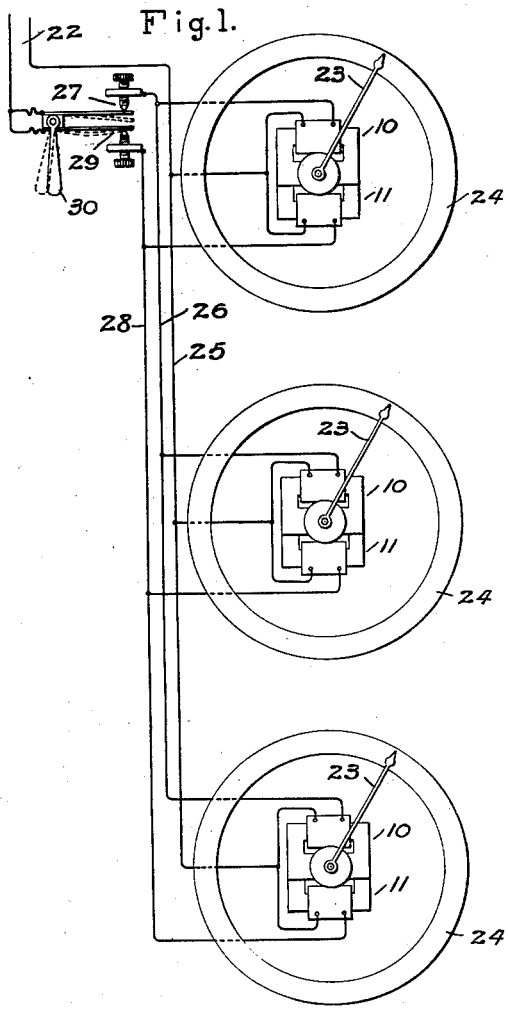
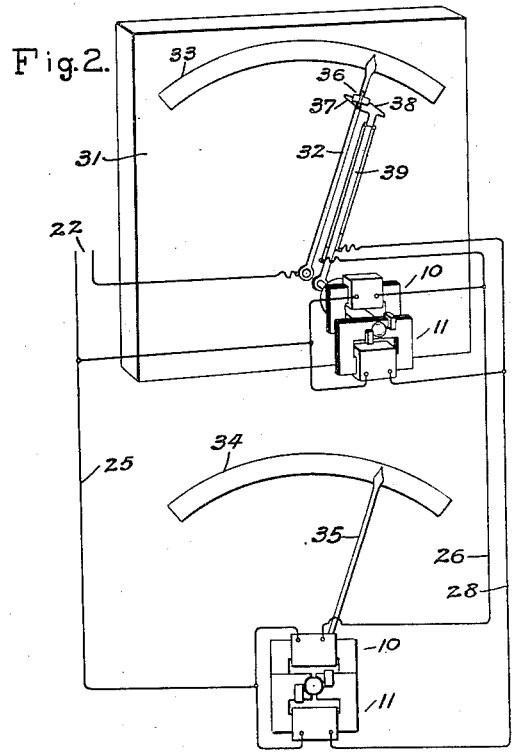
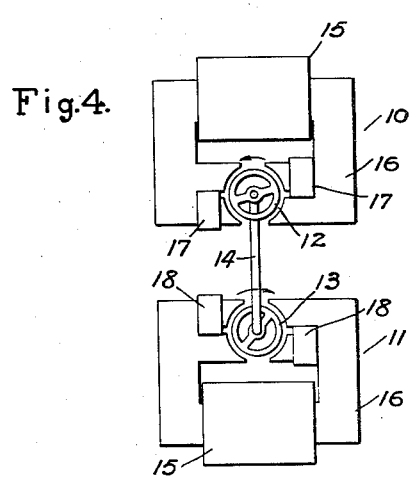
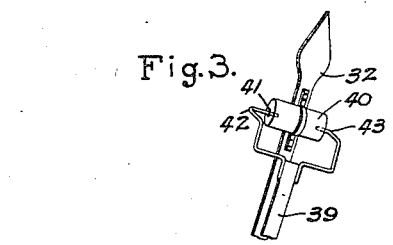
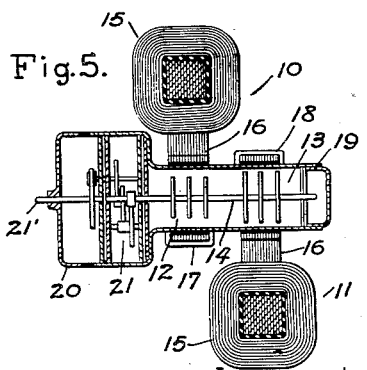
Inventor:
Henry E. Warren,
by Charles E. Mullen
His Attorney.

Patented Jan. 1, 1935

1,986,613

UNITED STATES PATENT OFFICE 1,986,613

POSITION SIGNALING SYSTEM

Henry E. Warren, Ashland, Mass., assignor to General Electric Company, a corporation of New York Application October 25, 1929, Serial No. 402,508

6 Claims. (Cl. 177—337)

My invention relates primarily to a system and apparatus for transmitting and reproducing at a distant point or points the movement or position of a movable body. Its object is to provide a highly reliable, accurate, and economical system for this purpose. In carrying my invention into effect I make use of self-starting synchronous motor receivers so arranged as to be started and stopped substantially instantaneously in response to the movement of a signal transmitting contact device controlling the circuit of such motors.

It is of course well known that a pair of similar synchronous motors connected to the same alternating current system will operate in synchronism and that the rate and extent of operation of a synchronous motor energized from an alternating current system depends upon the system frequency and duration of energization. Where the motion to be transmitted is irregular requiring frequent starting, stopping or reversing of the receiving device the commercial type of self-starting synchronous motor as a receiving instrument has heretofore not been employed because of the possibility of error occasioned by the uncertainty of the stopping period of the motor at which time different motors are not tied together electrically. The stopping period of the usual type of self-starting synchronous motor depends on the inertia of the moving parts, the connected load, friction, etc. and unless the variables incident to these conditions are removed two or more synchronously operated devices connected to the system tend to gradually drift apart or scatter in proportion to the frequency of the starting and stopping operations.

In accordance with my invention this objectionable feature is overcome so that the simple and economical self-starting synchronous motor may be employed as an accurate position transmitter or receiver, or both. In carrying my invention into effect I provide each synchronous transmitter or receiver with two self-starting synchronous motors connected to operate the movable element of the device in opposite directions. If the motors of the different devices have the same synchronous speeds, as will usually be the case, the gear ratios between them and the indicators should be the same and the motor characteristics should be the same. These motors are both normally energized when no movement is being transmitted and when in this condition the movable element may be said to be magnetically locked in a stationary position. To transmit motion one of the motors is deenergized. The other motor then starts and reaches synchronous speed almost instantaneously. To stop the movement the deenergized motor is again energized and the device stops almost instantaneously. The starting periods of different devices are always the same and the stopping periods of the different devices are always the same. The reason for this is that the motor torques are always present, either as starting, running, or braking torques, and are considerably in excess of and predominate over friction which might vary in different devices due to temperature variations and corresponding changes in the viscosity of the lubricating oil, for example. If, for instance, the braking torque is 95% and friction averages 5% of the stopping force, a variation in friction, even as much as 20%, will produce at most only a 1% variation in the total stopping force so that any expected variation in friction would have no noticeable effect upon the stopping period. It is, of course, expected that reasonable care will be taken in selecting motors and devices going into the system, and in the manner of their installation, so as to obtain devices that have substantially similar overall characteristics in normal operation.

The features of my invention which are believed to be novel and patentable will be pointed out in the claims appended hereto. For a better understanding of my invention reference is made in the following description to the accompanying drawing which illustrates in Fig. 1 a manually controlled position signaling system arranged in accordance with my invention; Fig. 2 shows the use of the system as employed to automatically transmit the movement and indications of an indicating instrument to a remote point and reproduce such indications; Fig. 3 is a detail view of a frictionless contact device that may be used on the instrument pointer of the transmitter of Fig. 2; Fig. 4 is a diagrammatic explanatory view of a preferred arrangement of the two mechanically connected synchronous motors constituting one of the synchronous elements of my invention; and Fig. 5 is a sectional view of the commercial form of the synchronizing element.

In explaining my invention it will first be desirable to consider the construction and operation of the synchronizing element diagrammatically represented in Fig. 4. Here I have represented two self-starting synchronous motors 10 and 11 having their rotors 12 and 13 both connected to a shaft 14. The field coils are represented at 15, the laminated stator iron at 16, and the shading coils on the pole tips at 17 and 18 respectively. The motors are exactly similar with the one exception that the shading coils 17 of the motor 10 are placed to cause counter-clockwise rotation of rotor 12, whereas the shading coils 18 of motor 11 are placed to cause clockwise rotation of rotor 13, as indicated by the arrows adjacent to the two rotors. Each motor is of the well known self-starting synchronous type and a detailed explanation of such a motor may be found in my United States Patent 1,546,269, July 4, 1925. In this type of motor the coil 15 is energized by alternating current and the shading coils change the alternating flux into a rotating magnetic field in the space between the pole pieces occupied by the rotor. The rotor comprises one or more elements each comprising a continuous flat ring provided with a magnetic bar across the diameter. The elements are made of magnetic steel. The continuous ring comprises the starting element and the magnetic bar across the diameter comprises the synchronizing element for a two-pole rotor. Starting is caused by magnetic remanence in the magnetic ring which causes it to be pulled around with the rotating field and synchronous operation is caused by the two-pole magnetic bar rotor operating in synchronism with the rotating magnetic field in a well understood manner. This type of motor is capable of starting and reaching synchronism substantially instantaneously. The relative dimensions of the rotor elements are indicated in Figs. 4 and 5 and the number of rotor elements per motor may vary depending upon the character of the load which the motor is to drive. Three rotor elements per motor are shown in Fig. 5 and when more than one element is employed the magnetic bars thereof will of course be in alinement.

In the commercial form of the device shown in section in Fig. 5 the rotating elements are contained within a brass casing 19 having a compartment 20 containing gears 21 to reduce the speed between the rotor shaft 14 and the terminal shaft 21'. The rotating parts are suitably lubricated as explained for example in my United States Patent 1,495,936, May 27, 1924.

I have found that if, in an arrangement such as is shown in Fig. 4 or 5, both motors are energized from the same source the rotating element is securely magnetically locked against rotation. If, then, one motor is deenergized the other will instantly start and run synchronously in one direction. If this last mentioned motor is now deenergized the rotating element will slow down and stop within a few seconds. However, the time required for it to stop under these conditions will depend upon the inertia of the rotating parts, the friction of the bearings, the temperature of the lubricant applied to the bearings and the nature of the connected load. However, I have found that if, instead of deenergizing the active motor to bring the device to a stop the other motor is energized, an extremely sudden stopping takes place. The probable explanation of this phenomenon is that when motor 11 for example is operating at synchronous speed and the other motor is deenergized the starting torque of the operating motor is zero since its rotor is operating in synchronism with the rotating field. However, when the other motor is energized its rotor is operating against its rotating magnetic field at twice synchronous speed. The magnetic remanence torque tending to stop it is therefore at a maximum and continues to exceed the starting torque of the other motor until the rotors are brought to a standstill at which time the average opposed starting torques are equal. The stopping torque obtained in this way, whatever its explanation, greatly predominates over the other variable factors which would otherwise determine the stopping period. The stopping period is therefore constant for all devices similarly designed and operated. Moreover, the stopping period is so short that for practical purposes it may be said to be substantially instantaneous. For best results the motors should have a strong field and the inertia of the rotating parts made as small as practicable. My experience also indicates that it is best to have the rotors 12 and 13 set with their magnetic axes at an angle to each other as indicated in Fig. 4, although this is not essential since the stopping occurs with extreme suddenness whatever the angular relation of the rotors. In the device as generally employed in a position signaling system both motors serve a double purpose. For one direction of operation one motor serves as the driving element and the other as the stopping element. Their function is reversed for the opposite direction of movement.

In Fig. 1 I have represented the use of the invention as applied to a manually controlled position signaling system such as is often used on large vessels to signal from the bridge to the engine room and pilot house, or on battleships for signaling between different gun control stations. In this figure 22 indicates a source of alternating current supply, for example 110 volts, 60 cycles, although the particular voltage and frequency employed is not important except from the practical standpoint. 10 and 11 respectively represent a number of self-starting synchronous motors connected through suitable reduction gearing to drive the indicating pointers 23 in opposite directions in the manner previously explained. 24 indicates stationary dials with which the pointers 23 cooperate and such dials will be graduated according to the information which it is desired to transmit to the three stations indicated by the three sets of devices. The pointers will be initially adjusted to similar positions and the three sets of devices will be similar. One line 25 from the source 22 is permanently connected to one terminal of each field coil of the six motors. The other terminals of motors 10 are connected through line 26 and switch 27 and the other terminals of motors 11 are connected through line 28 and switch 29 to the other side of the source 22.

The movable spring fingers of switches 27 and 29 are mounted on a pivot which is provided with an operating handle 30. When the handle 30 is released the spring fingers maintain the switch in the position shown in full lines with both switches 27 and 29 closed. In this position all of the six motors are energized and consequently all of the pointers 23 are held stationary. Movement of handle 30 to the left opens switch 27 as indicated by the dotted line position of the switch mechanism. This opens the circuits of motors 10 of the three devices and the motors 11 start and drive the pointers 23, let us say, in clockwise directions. To stop the movement the handle 30 is simply released. To reverse the movement the handle 30 is moved to the right so as to open the lower switch 29 and the circuit of motors 11. The pointers 23 will of course move in exact synchronism during synchronous operation of the driving motors. Since all the devices are similar and the starting and stopping periods are controlled by the motor torque characteristics, as previously explained, rather than by other considerations, the starting periods of the different devices will be the same and the stopping periods of the different devices will be the same. A variation in voltage and frequency will no doubt change the motor starting and braking torque characteristics slightly but since all motors are energized from the same source all motors will be equally and similarly influenced by such changes. As a result of this arrangement I have provided a very accurate and reliable position signaling system which is capable of considerable flexibility as to its application and use and which requires only three wires and inexpensive motor elements and is economical to install and operate. The current taken by the type of motor in question is very small. The continuous excitation under the stalled motor condition causes no damage and only a very small expenditure of energy.

Fig. 2 illustrates the application of the invention to a telemetering system where the indication of a measuring instrument pointer is transmitted and reproduced at another point. In this system the measuring instrument is indicated at 31. It is provided with a movable pointer 32 cooperating with a scale 33. The indication of this instrument is transmitted to a distant station and reproduced on a scale 34 by a pointer 35 through the apparatus of my invention having certain parts similar to those previously described and which have been given similar reference numbers. The instrument 31, together with one of my reversible double synchronous motor elements, constitutes a transmitter. The pointer 32 carries a contact device 36 cooperating with contacts 37 and 38 carried on an arm 39 driven by the reversible synchronous motor device comprising motors 10 and 11. Arm 39 of the transmitter, and pointer 35 of the receiver are geared to their motor elements in the same ratio and have corresponding directions and rates of movement. Contacts 36, 37 control the circuit of motors 10 and contacts 36, 38 control the circuit of motors 11. These circuits are normally closed. A deflection of pointer 32 to the left or right will open the circuits 28 or 26 at contacts 38 or 37. Arm 39 and pointer 35 will follow the movement of pointer 32 through the operation of the system until one or the other of contacts 38 or 37 is closed again.

In Fig. 3 I have represented a form of contacting device between pointer 32 and arm 39 which will serve the required purpose without interfering with the free movement of the measuring instrument pointer. This contacting device is not my invention and is described here merely by way of showing one practicable arrangement. The pointer 32 carries a barrel-shaped container 40 having small openings 41 in its ends. The container 40 is nearly filled with mercury. However the openings 41 are small enough so that the surface tension of the mercury prevents the latter from spilling out of the end openings under all normal conditions. The openings 41 are in alinement with the ends of the slender contact fingers 42 and 43 and these fingers are bent around and secured to arm 39 and are connected to lines 26 and 28 respectively. The ends of fingers 42 and 43 enter into the openings 41 and make frictionless contact with the mercury in barrel 40. Normally both fingers are in contact with the mercury but a slight movement of the pointer to the right will cause the contact to be broken at the end of the finger 42 and a slight movement to the left will cause the contact to be broken at the end of finger 43.

The mercury in the barrel 40 is suitably connected to one side of source 22. This form of contact is advantageous in that it does not interfere with the true measurement position of pointer 32. The current to be broken at the contacts is very small and the barrel 40 needs to be only large enough to contain a few drops of mercury.

It will be seen that the movement of pointer 32 controls the synchronous positioning elements so that arm 39 and pointer 35 will closely follow the movement of pointer 22.

In my copending application Serial No. 331,149 filed January 8, 1929, I have described another use of my reversible double synchronous motor position signaling invention. In said application the transmitting contact device is controlled in accordance with the direction and extent of the error in the frequency of an alternating current generating system and the reversible synchronous motor receiving element is included in a control system for the power generating apparatus. The claims in said other application are not directed to the novel features of the reversible synchronous motor position signaling apparatus. However the claims in the present application are intended to cover the applications herein described and referred to and such other modifications and applications as fall fairly within the true spirit and scope of my invention.

In certain measuring devices where a quantity is measured with respect to time and in certain process timers it is often desirable to quickly reset a portion of the device to a zero position. The double reversible motor element of my invention being capable of precise reversible movements will be found useful in many such devices and when so used the apparatus will be considered to be a form of signaling device included within the scope of my invention.

In accordance with the provisions of the patent statutes I have described the principle of operation of my invention together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In a signaling system, a source of alternating current supply, a signaling device comprising an indicator and a pair of self-starting synchronous motors mechanically connected to operate said indicator in opposite directions, said motors being normally electrically connected to said source, and means for deenergizing one of said motors to permit the operation of said signaling device.

2. A position signaling system comprising a receiving device having an indicator and a pair of self-starting synchronous motors mechanically connected to operate said indicator in opposite directions, a common source of alternating current supply for said motors, and a transmitting device comprising circuit controlling means between said motors and the source of supply having a normal position in which both motors are energized and having different positions to separately deenergize either of said motors.

3. In a system of the class described, a plurality of motion signaling devices each having an indicator and a pair of self-starting synchronous motors for driving said indicator in opposite directions, a common source of alternating current supply for all of said motors, and means for controlling the circuits for all of said motors whereby all of said motors may be simultaneously energized when no motion is being transmitted and whereby only one motor of each device is energized to transmit motion.

4. In a system of the class described, a motion signaling device, an indicator therefor, a self-starting synchronous motor for driving said indicator in one direction, a self-starting synchronous motor for driving said indicator in the opposite direction, a common source of alternating current for both motors, control means for energizing only one of said motors from said source for one direction of movement, energizing only the other motor from said source for the opposite direction of movement and energizing both motors from said source for substantially instantaneously stopping such movements.

5. In a position signaling system, a position signaling device provided with an indicator and a pair of similar self-starting synchronous motors arranged to operate said indicator in opposite directions, and control means for separately energizing said motors for operation of said indicator in the opposite directions, said control means having provisions for simultaneously energizing both of said motors to produce electric braking action to bring the indicator to a sudden stop immediately following operation by either of said motors.

6. In a position signaling system, a position signaling device provided with an indicator and a pair of similar self-starting synchronous motors arranged to operate said indicator in opposite directions, a common shaft to which the rotors of both motors are directly connected, speed reducing gearing between said shaft and indicator, and control means for separately energizing said motors for operation of said indicator in opposite directions, said control means having provisions for simultaneously energizing both of said motors to produce electric braking action to bring the indicator to a sudden stop immediately following operation by either of said motors.

HENRY E. WARREN.